Figure 1:
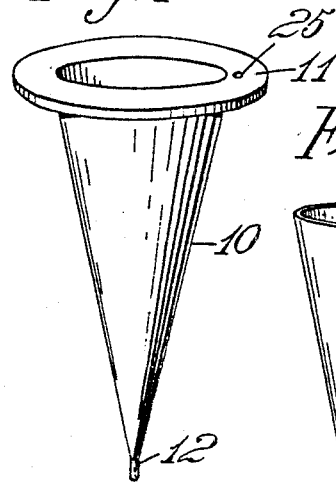

Sept. 22, 1959  J. REES ET AL  2,905,578
MANUFACTURE OF HOLLOW ARTICLES
Filed March 6, 1953

INVENTORS
JOHN REES &
G. C. E. B. HULBERT
BY
Wilkinson & Mawhinney
ATTYS.

United States Patent Office 2,905,578
Patented Sept. 22, 1959

2,905,578

MANUFACTURE OF HOLLOW ARTICLES

John Rees and George Charles Edward Burgis Hulbert, Bristol, England, assignors, by mesne assignments, to Bristol Aircraft Limited, Bristol, England, a British company Application March 6, 1953, Serial No. 340,681

Claims priority, application Great Britain March 12, 1952

12 Claims. (Cl. 154—90)

This invention relates to the manufacture of hollow articles such as surfaces of revolution, and concerns the manufacture of hollow articles from resinous material reinforced with fibrous material more especially in the case where it is important to preserve a uniform structure for the article. A particular case in point is the production of conical radomes for aircraft, missiles and the like, in which it is important that the electrical and di-electric properties, as well as the structural strength should be uniform over the surface of the radome.

It is known to produce hollow articles of regular or irregular shape by applying layers of fibrous material, such as cloth woven from spun glass fibre impregnated with liquid resinous material, to a former until a sufficient thickness has been attained, and then curing the resin, but this method does not produce a regular structure since the layers of cloth overlap more in some places than in others, especially when the body is not cylindrical. Furthermore this method does not guarantee uniform thickness of the finished body.

According to the present invention a method of manufacturing hollow articles comprises winding a layer of fibrous cord upon a former corresponding in shape to the hollow interior of the article, inserting the layer bearing former and uncured liquid thermosetting resin into a hollow mould corresponding in shape to the exterior of the article, allowing the resin to impregnate said layer, and then curing the resin, the article being thereafter removed from the mould and the former.

The cord may be of any desired construction, for example a single spun strand, or two or more such strands twisted, plaited or otherwise combined in any form and the term "cord" is to be understood, in this specification, to include elongated fibrous strand material of flattened as well as circular cross-section which can, when desired, be wound on the former to be employed with its turns abutting one another without overlapping.

Preferably the turns of said layer are wound so as to lie in mutual contact with one another, and from a single length of cord.

The layer may however be wound from a plurality of lengths of cord, the cords being wound simultaneously from one end of the former and laid like the turns of a multistart thread.

According to a feature of the present invention a plurality of said layers of cord may be wound upon the former, and in this case, the layers may be wound all in the same direction with the turns of superposed layers lying between each other, or, may be wound in opposite directions, whichever be desired.

Figure 2:
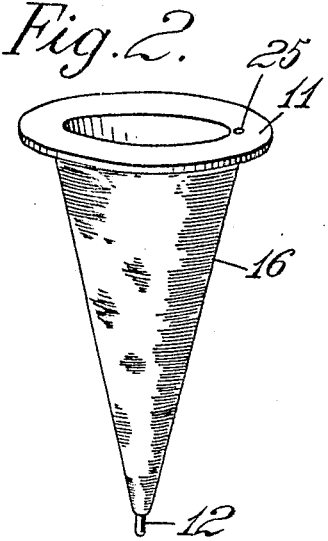
Figure 4:
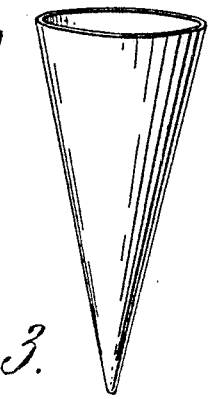
Figure 3:
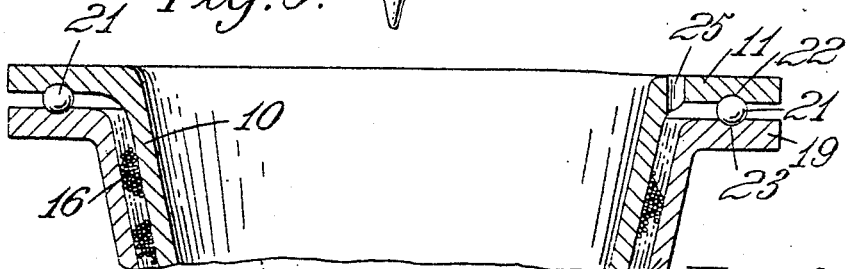
Figure 5:
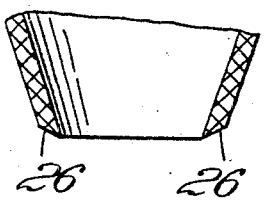
Figure 6:
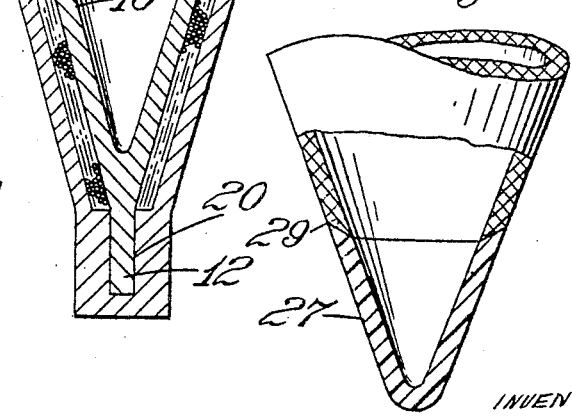

One method in accordance with the invention as applied to the manufacture of a conical radome will now be described, by way of example, with reference to the accompanying drawings whereof:

Figure 1 is a perspective view of a former corresponding in shape to the hollow interior of the radome, Figure 2 is a view corresponding to Figure 1, but showing the former wound with a number of layers of cord, Figure 3 is a partial cross-sectional elevation partially broken away, showing the former of Figure 2 after having been fully inserted into a mould corresponding in shape to the exterior of the radome, Figure 4 is a perspective view of the radome after having been removed from the mould and the former, Figure 5 shows, in cross-sectional elevation, the forward portion of the radome following the next step in its production, and Figure 6 shows, in part sectional elevation, the forward portion of the radome to which a separately cast nose piece has been attached.

Referring to Figure 1, a conical metal former 10 corresponding in shape to the hollow interior of the radome has an outwardly directed circumferential flange 11 at its larger end. At its small end the former carries a spigot 12 extending axially of the former.

The former 10 is first coated with a parting agent such as paraffin wax and is then wound with one or more layers 16 (see Figure 2) of cord the layers being wound either in the same or alternately opposite directions. In the example now being described the former is wound with four layers of glass fibre cord of about 0.1 inch in cross-sectional diameter. The cord is made up from eleven strands of glass fibre, the strands being plaited together.

The four layers 16 are wound in the same direction, each from a separate length of cord, with the turns of each layer lying in mutual contact with one another and the turns of superposed layers lying between each other as is shown in Figure 3. The total thickness of winding built up in this way is about 0.36 inch.

The cord is preferably wound by means of a winding machine of known form comprising a rotatable ring-like carrier having a number of bobbins, the carrier surrounding the former which is mounted upon a carriage so as to be co-axial with said carrier and movable along the axis of the carrier at a speed so related with the speed of rotation of the carrier that cord from one or more of the bobbins is laid on the former in turns which are mutually in contact with one another. If desired a number of bobbins on the carrier may be loaded with cord and the cord from the bobbins wound simultaneously on the former from one end the turns of cord being laid like the turns of a multistart thread. In the example now being described however, one bobbin only is used and each layer 16 of cord is wound on the former 10 from the spigot end, the end of each length of cord to form one layer being initially secured to the former, or the previous layer of cord, with a synthetic resin used as an adhesive. Figure 2 shows the former 10 after having been wound with the layers of cord.

The wound former is then slowly lowered into a mould 19 (see Figure 3) corresponding in shape to the exterior of the radome and having an outwardly directed circumferential flange 19 at its larger end. The mould is coated with a layer of paraffin wax to act as a parting agent, and is placed in an upright position, a predetermined quantity of an uncured liquid thermosetting resin, which, in the example being described, is of the cold setting type, being placed in the mould. Resin requiring a raise in temperature to effect curing, and therefore setting, may be used as opposed to the cold setting type if desired.

The wound former is lowered into the mould at a speed slow enough to allow the air displaced by the former to escape from the mould as the resin impregnates the layers 16 of cord, and as the former 10 becomes fully entered into the mould 18 it is centered in the mould by the spigot 12 which enters a blind axial bore 20 in the bottom of the mould, and by balls 21 running in circumferential grooves 22, 23, in the flanges 11 and 19 respectively. When centred, the distance between the face of the former and the face of the mould is 0.35 inch, i.e. just a little less than the thickness of the layers of cord. The former is then slowly rotated for a short period to facilitate the escape of any air bubbles which may have been trapped in the fibres of the cord wound on the former.

As the thermosetting resin gells it contracts somewhat, and further uncured liquid resin is added through a hole 25 in the flange 11 to top up the mould, this hole communicating with the space between the former 10 and the mould 18 as shown in Figure 3.

When the resin is finally set, the radome is removed from the mould and the former and appears as shown in Figure 4.

To complete the radome, its smaller end is machined as shown in Figure 5 to form an inclined face 26 for a scarf joint 29 with a separately cast nose piece 27 (see Figure 6) which is secured to the radome with a cold setting epoxy-resin adhesive.

The nose piece 27 is cast from cold setting resin without cord reinforcement, between a suitably shaped mould and former.

The material of the cord may be selected as desired, depending upon the properties required in the finished article. Glass fibre cord is found to be suitable in most cases where the article has to be strong, fire-proof, and of good electrical insulating and dielectric properties.

The method of making articles which is provided by this invention has been found both convenient and economical.

By reason of the fact that the article is cast between a former and a mould, it is possible to produce the article with a desired internal and external shape and wall thickness without irregularities in its structure.

We claim:

1. A method of manufacturing from resinous material reinforced with fibrous material a hollow rigid article of tapered formation and circular cross-section, the article having a uniform wall thickness and the reinforcing fibrous material being uniformly distributed throughout the wall of the article, which method comprises helically winding a layer of fibrous cord upon the surface of a former corresponding to the hollow interior of the article, the turns of said fibrous cord layer being uniformly distributed along said former surface with adjacent turns lying in side by side contact without overlapping one another, providing a rigid hollow mould having a moulding surface corresponding to the exterior of the required article, the mould having its smaller end closed, placing a predetermined quantity of liquid thermosetting resin in the mound and thereafter lowering the cord bearing former into the resin containing mould at a speed which allows air to escape as the resin impregnates said cord, centering the former in the mould so that the surface of the former is uniformly spaced from the moulding surface of the mould, and then slowly rotating the former for a short period to facilitate the escape of any entrapped gaseous bubbles, and then curing the resin, the article being thereafter removed from the mould and the former.

2. A method as claimed in claim 1 wherein said layer is wound from a single length of cord.

3. A method as claimed in claim 1 wherein said layer is wound from a plurality of lengths of cord, the cords being wound simultaneously from one end of the former and laid like the turns of a multistart thread.

4. A method as claimed in claim 1 wherein a plurality of said layers of cord are wound upon the former the turns of each layer being evenly distributed along the former surface with adjacent turns of the layer lying in side by side contact without overlapping one another.

5. A method as claimed in claim 4 wherein said cord is of circular cross section and said layers are all wound in the same direction, the turns of superposed layers lying between each other.

6. A method as claimed in claim 4 wherein successive layers are wound in opposite directions.

7. A method of manufacturing a rigid hollow conical radome from resinous material reinforced with fibrous material, the radome having electric and dielectric properties and a structural strength all of which are uniform over the surface of the radome, which method comprises helically winding a layer of fibrous cord upon the surface of a former corresponding to the hollow interior of the radome, the turns of said fibrous cord layer being uniformly distributed along said former surface with adjacent turns lying in side by side contact without overlapping one another, providing a rigid hollow mould having a moulding surface corresponding to the exterior of the required radome, the mould having its smaller end closed, placing a predetermined quantity of liquid thermosetting resin in the mould and thereafter lowering the cord bearing former into the resin containing mould at a speed which allows air to escape as the resin impregnates said cord, centering the former in the mould so that the surface of the former is uniformly spaced from the moulding surface of the mould, and then slowly rotating the former for a short period to facilitate the escape of any entrapped gaseous bubbles, and then curing the resin, the radome being thereafter removed from the mould and the former.

8. A method of manufacturing a rigid hollow conical radome from resinous material reinforced with fibrous material, the radome having electric and dielectric properties and a structural strength all of which are uniform over the surface of the radome, which method comprises helically winding a plurality of layers of fibrous circular cross-sectioned cord upon the surface of a former corresponding to the hollow interior of the radome, the turns of each fibrous cord layer being uniformly distributed along the former surface with adjacent turns lying in side by side contact without overlapping one another, the layers all being wound in the same direction, with the turns of superposed layers lying between each other, providing a rigid hollow mould having a moulding surface corresponding to the exterior of the required radome, the mould having its smaller end closed, placing a predetermined quantity of liquid thermosetting resin in the mould and thereafter lowering the cord bearing former into the resin containing mould at a speed which allows air to escape as the resin impregnates said cord, centering the former in the mould so that the surface of the former is uniformly spaced from the moulding surface of the mould, and then slowly rotating the former for a short period to facilitate the escape of any entrapped gaseous bubbles, and then curing the resin, the radome being thereafter removed from the mould and the former.

9. A method of manufacturing a hollow rigid tapered article having a uniform wall thickness from resinous material reinforced with fibrous material, the reinforcing material being uniformly distributed throughout the wall of the article, which method comprises helically winding at least one layer of fibrous cord upon the surface of a former corresponding to the hollow interior of the required article so as to build up on the former surface a winding of a thickness substantially equal to but not less than the required wall thickness of the article, adjacent turns of each layer composing said winding lying in side by side contact without overlapping one another, placing a predetermined quantity of an uncured liquid thermosetting resin into a rigid hollow mould having a moulding surface corresponding to the exterior of the required article, lowering the cord bearing former into the resin containing mould, and centering the former in the mould between said former surface and said mould surface, and then curing the resin, the article being thereafter removed from the mould and the former.

10. A method of manufacturing a hollow rigid article having a wall of predetermined accurate uniform thickness and constitution, comprising winding on the outer surface of a former corresponding to the hollow interior of the required article multiple turns of a multi-fibre cord, said turns lying in closely packed side-by-side non-crossing mutual contact, so as to build up on said outer surface a winding of a thickness and area substantially equal to but not less than the thickness and area of the wall of the required article and having air-filled interstices between the individual fibres, bringing the cord-bearing former into positively located relation with a hollow rigid mould having an inner moulding surface corresponding to the exterior of the required article so that the space between the outer surface of the former and the inner surface of the mould is of uniform thickness equal to the predetermined required thickness of the wall of the article, displacing all air from said air-filled interstices by a setting liquid resinous material, and removing the article from the mould and the former after the said liquid resinous material has set.

11. A method as claimed in claim 10, in which said setting liquid resinous material is a material which contracts during setting and in which said space between the outer surface of the former and the inner surface of the mould is kept full of resin, despite such contraction, by adding fresh liquid resin while setting is taking place.

12. A method of manufacturing a rigid circular conical radome having a wall of predetermined accurate uniform thickness and constitution, consisting of winding on the outer surface of a former corresponding to the hollow interior of the radome multiple turns of a multi-fibre glass fibre, said turns lying in closely packed side-by-side non-crossing mutual contact, so as to build up on said outer surface a winding of a thickness and area substantially equal to but not less than the thickness and area of the wall of the radome and having air filled interstices between the individual fibres, bringing the fibre-bearing former into positively located relation with a hollow rigid mould having an inner moulding surface corresponding to the exterior of the radome so that the space between the outer surface of the former and the inner surface of the mould is of uniform thickness equal to the predetermined required thickness of the wall of the radome, displacing all air from said air-filled interstices by a thermosetting resin and removing the radome from the mould and the former after the said resin has set.

References Cited in the file of this patent

UNITED STATES PATENTS

| | | |
|---|---|---|
| 863,711 | Geraedts et al. | Aug. 20, 1907 |
| 1,458,931 | Frederick | June 19, 1923 |
| 1,547,646 | Frederick | July 28, 1925 |
| 1,731,240 | Apfelbaum | Oct. 15, 1929 |
| 2,010,475 | Bowen | Aug. 6, 1935 |
| 2,250,967 | Riddle | July 29, 1941 |
| 2,441,097 | Hicks | May 4, 1948 |
| 2,495,640 | Muskat | Jan. 24, 1950 |
| 2,514,597 | Daly | July 11, 1950 |
| 2,594,693 | Smith | Apr. 29, 1952 |
| 2,602,766 | Francis | July 8, 1952 |
| 2,613,397 | Borkland | Oct. 14, 1952 |
| 2,629,894 | Boggs | Mar. 3, 1953 |
| 2,714,414 | De Ganahl et al. | Aug. 2, 1955 |
| 2,744,043 | Ramberg | May 1, 1956 |
| 2,749,643 | Scott | June 12, 1956 |